UNITED STATES PATENT OFFICE.

JAMES B. RANDOL AND CHARLES W. WRIGHT, OF NEW ALMADEN, CAL.

IMPROVEMENT IN PROCESSES FOR PURIFYING QUICKSILVER.

Specification forming part of Letters Patent No. 144,923, dated November 25, 1873; application filed October 4, 1873.

*To all whom it may concern:*

Be it known that we, JAMES B. RANDOL and CHARLES W. WRIGHT, of New Almaden, Santa Clara county, State of California, have invented an Improved Process for Purifying Quicksilver; and we do hereby declare the following description sufficient to enable any person skilled in the art or science to which it most nearly appertains to make and use our said invention or improvement without further invention or experiment.

Our invention relates to an improved process for purifying quicksilver of the soot and other foreign matter which becomes intermingled with it during the reducing and condensing process, or that may become intermingled with it in any other way.

The blast or draft which draws off the mercurial fumes into and through the condensers from the furnace where the ore is roasted also carries with it a mechanical mixture of fine dirt, particles of unconsumed carbon, some ash, some undecomposed cinnabar, and various other impurities and minute particles of the metal. This combination of matter is deposited in the condensers in a condition resembling lamp-black or paste, it having become moistened by the steam introduced from the fuel and ore, and, as a consequence, it becomes intermingled with the quicksilver.

The object of our invention is to separate this soot or mixture or other foreign impurities from the quicksilver. To do this, we place the quicksilver, intermixed with soot or other extraneous substances, in an iron or other suitable vessel or tank, to which water, heated to the requisite degree, is added, and the substances intimately mixed. Wood-ashes or other suitable alkali is then added for the purpose of still further cleansing the quicksilver, which will flow forth in a bright stream from a pipe properly placed in the vessel.

Having thus described our invention, what we claim, and desire to secure by Letters Patent, is—

The process of purifying mercury by treating it, under agitation, with heated water and alkaline matter, substantially as set forth.

In witness whereof we hereunto set our hands and seals.

JAMES B. RANDOL. [L. S.]
CHARLES W. WRIGHT. [L. S.]

Witnesses:
RALPH LOWE,
F. FREDLER.